(12) United States Patent
Fang et al.

(10) Patent No.: US 8,488,167 B2
(45) Date of Patent: Jul. 16, 2013

(54) COMPUTERIZED CHART RECORDER

(75) Inventors: Hsin-Fa Fang, Taoyuan County (TW);
Ming-Churng Hsieh, Taoyuan County (TW); Chung-Liang Chen, Taoyuan County (TW); Ming-Chen Yuan, Taoyuan County (TW); Cheng-Si Tsao, Taoyuan County (TW); Kang-Neng Peng, Taoyuan County (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 352 days.

(21) Appl. No.: 12/890,971

(22) Filed: Sep. 27, 2010

(65) Prior Publication Data
US 2012/0075660 A1    Mar. 29, 2012

(51) Int. Cl.
*G06F 3/12* (2006.01)

(52) U.S. Cl.
USPC ............. 358/1.15; 358/1.3; 358/296; 346/17; 346/34; 346/35; 346/76.1; 600/300; 128/920

(58) Field of Classification Search
USPC ................ 358/1.3, 1.15, 296; 346/17, 34, 35, 346/76.1; 600/300; 128/920
See application file for complete search history.

(56) References Cited

U.S. PATENT DOCUMENTS

| | | | |
|---|---|---|---|
| 389,635 A | 9/1888 | Bristol | |
| 1,163,279 A | 12/1915 | Stevens | |
| 4,222,057 A * | 9/1980 | Cuvelier | 346/33 R |
| 4,240,083 A | 12/1980 | Stires, III | |
| 4,253,104 A | 2/1981 | Paulsen | |
| 4,468,678 A | 8/1984 | Phillipps et al. | |
| 5,101,220 A | 3/1992 | Sullivan | |
| 5,572,240 A * | 11/1996 | Schmidt | 346/17 |
| 5,830,150 A * | 11/1998 | Palmer et al. | 600/523 |
| 7,135,987 B1 * | 11/2006 | LaMotte et al. | 340/870.07 |
| 2003/0007019 A1 | 1/2003 | Levine | |
| 2003/0037255 A1 * | 2/2003 | Yoshino et al. | 713/200 |

\* cited by examiner

*Primary Examiner* — Jacky X Zheng
(74) *Attorney, Agent, or Firm* — Rosenberg, Klein & Lee

(57) ABSTRACT

A computerized chart recorder is revealed, comprises a signal conversion unit, an operation control unit, a printing control unit, and a database. A signal conversion unit receives measurement signals of a measurement instrument, and converts the measurement signals to signal conversion data. A operation control unit receives the signal conversion data required for printing, produces corresponding chart data, and prints the curve of signal variations, which can be also displayed on a human-machine interface unit. Whether to store the data or to print can be determined. Besides, the data can be also transmitted to a printing control unit. When the printing control unit is activated, it can receive the chart data and the quality assurance data, and control a printing unit to emulate the chart recorder for executing chart recording. In addition, the quality assurance data can be printed as well for complying with the requirements of the quality-assurance operations.

13 Claims, 4 Drawing Sheets

Fig. 4

COMPUTERIZED CHART RECORDER

FIELD OF THE INVENTION

The present invention relates generally to a chart recorder, and particularly to a computerized chart recorder.

BACKGROUND OF THE INVENTION

In general, a chart recorder receives the data measured by a measurement instrument, and records and plots directly on recording paper promptly. The chart recorder is commonly applied for observing the variation trend of signals produced by a monitoring instrument. Regarding to the past development of the chart recorder, the earliest patent was awarded to William Henry Bristol in the U.S. Pat. No. 389,635 entitled "Pressure Indicator and Recorder" in 1888. The patent disclosed a pressure indicator and recorder similar to a chart recorder in the form of a disk. The pressure indicator and recorder can be applied to monitoring the pressure of fluids such as vapor, liquids, and gases, or even to barometers, thermometers, and other analog measurement instruments. With the increased demand for monitoring and the progress of technologies, current chart recorders are widely applied to measurements, monitoring, and recording in various scientific researches. Thereby, we can see some patents related to chart recorders appear increasingly including the formats and operations of recording paper, methods for printing and displaying, and record transmission methods. The important patents related to chart recorders in the US are summarized in Table 1.

TABLE 1

| U.S. Pat. No./ application Ser. No. | Title | Date of Patent | Inventors |
| --- | --- | --- | --- |
| U.S. Pat. No. 389,635 | Pressure indicator and recorder | Sep. 18, 1888 | William H. Bristol |
| U.S. Pat. No. 1,163,279 | Water stage recorder | Dec. 7, 1915 | John C. Stevens |
| U.S. Pat. No. 4,240,083 | Programmable strip chart recorder | Dec. 16, 1980 | Stires John C Iii [Us] |
| U.S. Pat. No. 4,253,104 | Strip chart recorder | Feb. 24, 1981 | Paulsen Dean R |
| U.S. Pat. No. 4,468,678 | System for controlling a strip chart recorder | Aug. 28, 1984 | Phillips Patrick G; Fairchild William G |
| U.S. Pat. No. 5,101,220 | Chart recorder with thermal print head and sound generator | Mar. 31, 1992 | Sullivan Michael J |
| U.S. application Ser. No. 2003/007,019 | Chart recorder programming interface | Jan. 9, 2003 | Levine Matthew |
| U.S. Pat. No. 7,135,987 | Wireless chart recorder system and method | Nov. 14, 2006 | Lamotte Robert; Perry William; Saltzstein William |

Although there exists lot of computerized chart recorders currently, they do not address on management of considerable quantities of measurement data and on quality assurance, which is valued by modern measurement professionals. In addition, they are high-priced. The amount of samples from inspection operations in exterior environments is extremely huge; therefore, it is necessary to fulfill quality assurance promptly. If the inspection target is location-specific, its location should be recorded with clarity, and the overall inspection progress of the inspection operations in exterior environments should be understood rapidly. Because of tight schedule, each of the inspection operations in exterior environments needs to have a backup chart recorder. Nevertheless, a decent chart recorder costs highly, increasing many backup costs. On the other hand, it is time-consuming if a backup chart recorder is purchased for the occasion of each inspection operation in exterior environments and thereby the schedule might be delayed. According to the experience, after thousands of inspection operations in exterior environments are completed, it is required to finish the report in one week. Consequently, the requirement for data processing and performance integration is extremely high. The work is hard to be accomplished without proficient personnel and good data management and computer database.

Accordingly, the present invention provides a computerized chart recorder, which uses a computer to emulate the function of a recorder by printing promptly the variation trend measured by a measurement instrument and the necessary information for quality control. The computerized chart recorder according to the present invention can set directly the output amplitude and the percentage range for overcoming the adjustment problem of multiple detecting heads. It also connects to the computer directly, and converts charts and data to database directly, which is particularly beneficial for organizing tedious reports. Besides, graphical labels display the measured locations, facilitating schedule management of measurement tasks. The present invention is especially suitable for inspection operations in exterior environments with a huge amount of data. By applying the computerized chart recorder according to the present invention, data processing efficiency can be improved, and the annoyance of backuping costly chart recorders can be reduced.

SUMMARY

An objective of the present invention is to provide a computerized chart recorder, which could digitalize chart data and execute data quality assurance that breaks the function barriers of current chart recorders, improving recording quality, saving recording time, and enhancing efficiency.

Another objective of the present invention is to provide a computerized chart recorder, which uses database, graphical interface, and network for solving the problem of disorder and errors caused by paper or electronic records produced by current chart recorders. In addition, the overall performance of organizing data can be improved as well.

Still another objective of the present invention is to provide a computerized chart recorder, which uses a computer and a printer to emulate a chart recorder with a database for storing and managing chart data. Computer and printer both are very common devices in a modern laboratory. Thereby, backup demand of chart recorders could be avoided.

The computerized chart recorder according to the present invention comprises a signal conversion unit, an operation control unit, a printing control unit, a first human-machine interface, a database and a remote unit with the second human-machine interface. The signal conversion unit receives a plurality of measurement signals of a measurement instrument, and converts the plurality of measurement signals to a plurality of signal conversion data. The operation control unit is connected to the signal conversion unit, and receives the plurality of signal conversion data. Then the operation control unit produces chart data for plotting the curve of signal variations and displaying on a first human-machine interface unit, storing to the database, and transmitting to the printing control unit. In addition to displaying the curve of trend variations of the signals, the first human-machine interface unit has the functions of manual input for data management, quality control and inquiry. The quality assurance criteria of measurement could be input on the first human-machine interface. The first human-machine interface also could send control messages to the operation control unit for determining if to store the data to the database and if to activate the printing control unit. When the printing control unit is activated, it can receive the quality assurance information and the chart data. According to the predetermined method, the printing control unit can control a dot matrix printer to emulate a chart recorder for executing chart-recording tasks as well as recording the corresponding basic information, which may include recording time, measurement serial number, measurement instrument, operator and et al. signature locations of the operator and auditor, required by quality assurance. Besides, the operation control unit can connect to a second human-machine interface unit via the network for executing remote backup, inquiry, display, and printing of the database.

BRIEF DESCRIPTION OF THE DRAWINGS

FIG. 4 shows a diagram of a testing location according to an embodiment of the present invention.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
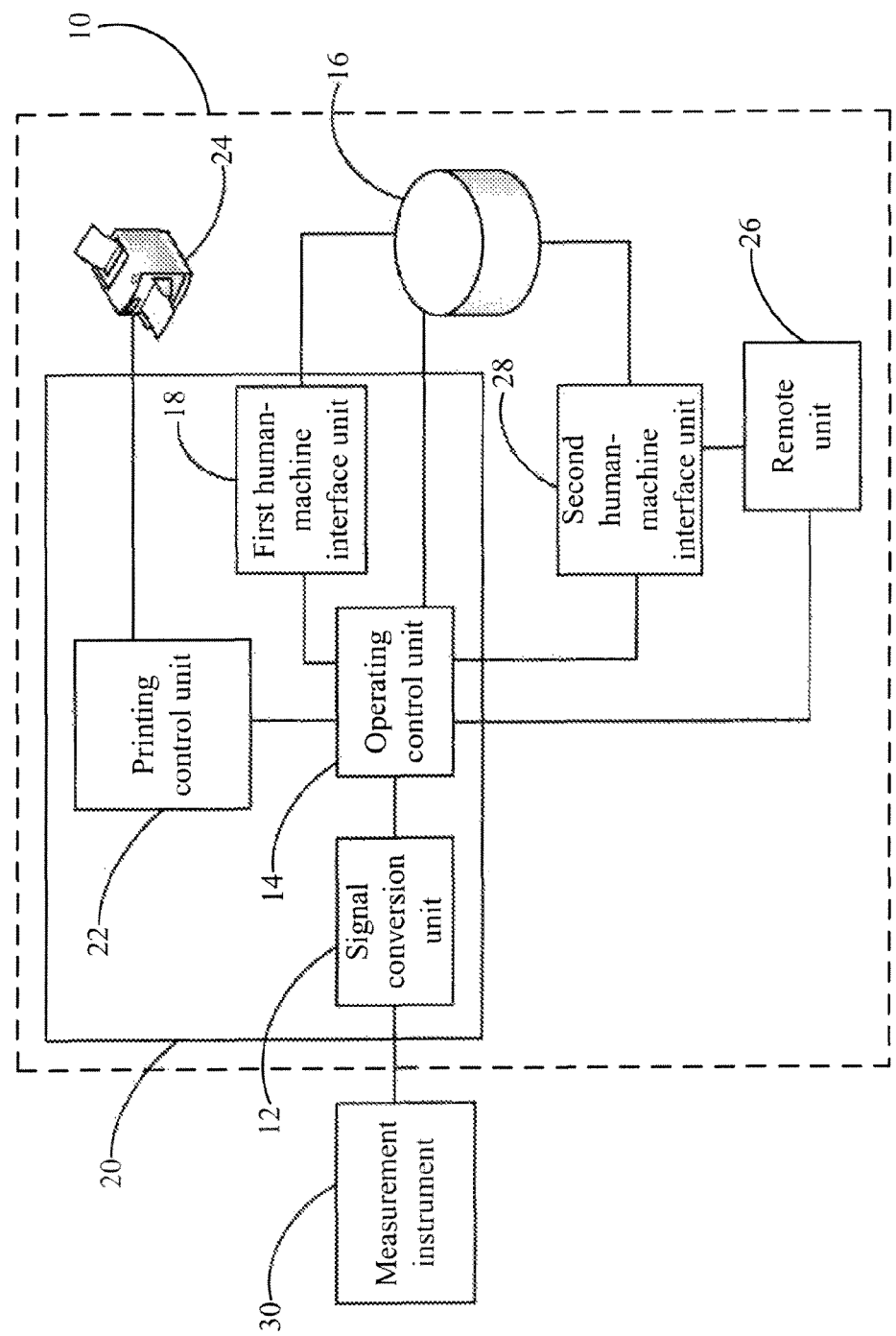
FIG. 1 shows a structural schematic diagram according to an embodiment of the present invention.

FIG. 1 shows a structural schematic diagram according to an embodiment of the present invention. As shown in the figure, the present invention provides a computerized chart recorder 10, which uses a computer to emulate the function of a recorder by printing promptly the variation trend measured by a measurement instrument and the necessary information for quality control. The computerized chart recorder according to the present invention can set directly the output amplitude and the percentage range for overcoming the adjustment problem of multiple detecting heads. It also connects to the computer directly, and converts charts and data to database directly, which is particularly beneficial for organizing tedious reports. Besides, graphical labels display the measured locations, facilitating schedule management of measurement tasks. The present invention is especially suitable for inspection operations in exterior environments with a huge amount of data. By applying the computerized chart recorder according to the present invention, data processing efficiency can be improved. The computerized chart recorder 10 comprises a signal conversion unit 12, an operation control unit 14, a database 16, a first human-machine interface unit 18, and a printing control unit 22. The signal conversion unit 12 receives a plurality of measurement signals measured by a measurement instrument 30, and converts the plurality of measurement signals to a plurality of signal conversion data according to the purpose of the task. For example, the unit of air concentration in the measurement instrument might be expressed in per cubic meters. However, according to the regulation, it is expressed in ppm. After setting the operation control unit 14, the signal conversion unit 12 can convert promptly the format recognizable by the operation control unit 14. Moreover, for simultaneous connection of multiple instruments, it is necessary to normalize the signals for easier comparison among them. Thereby, by setting the operation control unit 14, the signal conversion unit 12 can achieve the desired conversion.

The operation control unit 14 can operate promptly the plurality of signal conversion data acquired by the signal conversion unit 12, and produces chart data according to the plurality of signal conversion data for plotting the curve of signal variations and displaying on the first human-machine interface unit 18. In addition, the operation control unit 14 controls manually if to store the chart data to the database 16 and if to activate the printing control unit 22. Thereby, the computerized chart recorder 10 can choose to execute electronic recording, paper recording, both electronic and paper recording, or simply viewing the signals output by the measurement instrument 30. In addition to displaying the curve of signal variation trend and the functions of manual control, the first human-machine interface unit 18 also has the functions of manual input and inquiry. Manual input can produce quality assurance data, which corresponds to specific curves of signal variation trend. The content of the quality assurance data includes the quality assurance records required by quality assurance operations, including the unit of the measurement instrument, measurement items, measurement conditions, measurement recorders, and auditors.

The first human-machine interface unit 18 can also configure the method by which the operation control unit 14 operates the plurality of signal conversion data acquired by the signal conversion unit 12 for determining the output amplitude and the percentage range. Thereby, the adjustment problem of multiple detecting heads due to differences in their sizes can be overcome. The first human-machine interface unit 18 can further set specific threshold values for the operation control unit 14 and produce an alarm message. Accordingly, the operation control unit 14 can produce a corresponding alarm message or change the labels on the curve of signal variations of the instrument. When the variation of the curve of signal variations of the instrument exceeds the maximum threshold value or the minimum threshold value, a corresponding alarm message is produced or the labels on the curve of signal variations of the instrument are changed. If the inspection target is location-specific, the first human-machine interface unit 18 can display graphically the inspection location, which overcomes the problem of describing the inspection location in text. In particular, when the inspection quantity is huge, errors in inspection locations can be reduced. The data stored in the database 16 according to the instructions of the operation control unit 14 include the plurality of signal conversion data of the instrument signals, the alarm message, and the corresponding quality assurance data. When the printing control unit 22 is activated, it will drive a printing unit 24 to print. The printed contents include the plurality of signal conversion data of the instrument signals, the alarm message, and the corresponding quality assurance data, and are printed according to the predetermined formats.

The printing control unit 22 connects to the operation control unit 14, and produces a printing control signal according to the chart data. The printing control unit 22 selects a printing character, a printing location, and a printing value according to the chart data, and produces the printing control signal according to the chart data and the quality assurance data. Besides, the printing control unit 22 is a microprocessor or a digital signal processor, and is disposed in a center computer 20. The operation control unit 14 can activate the printing control unit 22, and drive the printing unit 24 to emulate a general chart recorder for printing promptly the curve of signal variations of the instrument. The quality assurance data can be printed prior to the printing of the curve of signal variations of the instrument by the printing unit 24. The printing control unit 22 is driven and controlled by the operation control unit 14, and receives the information provided by the operation control unit 14 for selecting the appropriate printing characters and driving the printing unit 24 to perform real-time printing. The information provided by the operation control unit 14 includes the measurement values of the measurement signals and prompting messages, which include general text reminders and alarms. The printing control unit 22 can configure the paper-feeding rate of the printing paper according to the duration of printing, just like how a general chart recorder does.

The printing unit 24 connects to the printing control unit 22, and prints the chart data according to the printing control signal. The printing unit 24 according to the present embodiment is a printer, especially a dot-matrix printer, for achieving the purpose of real-time printing. While printing the paper recording, the operation control unit 14 prints the curve of signal variations promptly according to the chart data by emulating a chart recorder through the printing control unit 22. The printing unit 24 prints the curve of signal variations promptly by emulating a chart recorder. The printing control unit 22 further can control the printing unit 24 to print more detailed data, such as time and data records, as well as quality assurance data, such as testing conditions, recorders, and auditors. When the signal values in the curve of signal variations of the instrument are judged to exceed the set threshold values according to the chart data, the operation control unit 14 will drive the printing unit 24 via the printing control unit 22 to print promptly prompting messages, alarms, or change the labels of the recoding points. The printing unit 24 can use multiple sheets of carbon paper for backuping paper records directly. Thereby, the present invention can activate the recording function via the operation control unit 14 for performing paper recording and electronic recording simultaneously.

In addition, the price of the printing control unit 22, the printing unit 24, and the computer with the operation control unit 14 is much cheaper than a commercial chart recorder. In comparison with the chart recorder, the computerized chart recorder according to the present invention has much cheaper backup costs owing to its common usage.

A remote unit 26 is connected to and controls the operation control unit 14. The remote unit 26 is a microprocessor or a digital signal processor. It can real-timely monitor the picture of the operation control unit 14 as well as inquiring the chart data. A second human-machine interface unit 28 is connected to the remote unit 26, which reads the curve of signal variations of the instrument and displays the curve on the second human-machine interface unit 28. The remote unit 26 reads the curve of signal variations of the instrument and the quality assurance data stored in the database 16 and displays them on the second human-machine interface unit 28. The second human-machine interface unit 28 lets the user of the remote unit 26 inquire the measurement results, and displays the curve of the signal variations of the instrument. When large-scale on-site measurements are performed, the second human-machine interface unit 28 can display graphically the measured locations, and thus enhancing the efficiency of management on the tasks.

It is thereby known from above that the present invention provides a computerized chart recorder, which uses a computer to improve efficiency as well as reducing costs. The computerized chart recorder according to the present invention comprises the signal conversion unit 12, the operation control unit 14, the database 16, the first human-machine interface unit 18, the printing control unit 22, the remote control unit 26, and the second human-machine interface unit 28. The signal conversion unit 12 converts the measurement signals of the measurement instrument 30 to signal conversion data. The operation control unit 14 of the computer operates and produces the corresponding curve of signal variation of the instrument and the corresponding quality assurance data. The printing control unit 22 drives the printing unit 24 for emulating a chart recorder and printing the curve and the quality assurance data. Besides, the storage and management functions of the database 16 are used for reusing the curve of signal variations of the instrument. By applying the computer and network simultaneously, the management of inspection operations and the quality assurance data is reinforced.

The computerized chart recorder according to the present invention uses the storage management function of the database 16 to perform electronic recording directly, in comparison with the commercial paperless chart recorders which record as individual files, the present invention improves efficiency in management and applications of the stored data, and is beneficial for processing a huge amount of data and producing subsequent reports. That is to say, the database 16 will receive a plurality of control instructions of the operation control unit 14 and store them. The human-machine interface unit has a graphical user interface for monitoring the inspection locations. Before accessing the records, by inputting a particular number or assigning directly on the graphical interface, the access records can be linked to a specific graphical location, and be displayed on the first or second human-machine interface units 18,28. When access is finished, the location can be labeled as already having had access record. Thereby, the locations haven't been inspected can be visualized clearly. When the quantity of the inspection data is extremely huge, the inspection operations usually need to be executed in shifts. The graphical interface of inspection locations provided by the first or second human-machine interface units 18, 28 will be very helpful for the management of inspection operations. By means of the network function, the remote unit 26 can monitor directly the picture provided by the operation control unit 14 via the second human-machine interface 28. The chart data can be accessed and displayed promptly anytime, and hence the variations of the measurement signal by the measurement unit 30 can be monitored. In addition, the measured results can be inquired directly, which is very convenient for quality-assurance and reporting operations.

Figure 2:
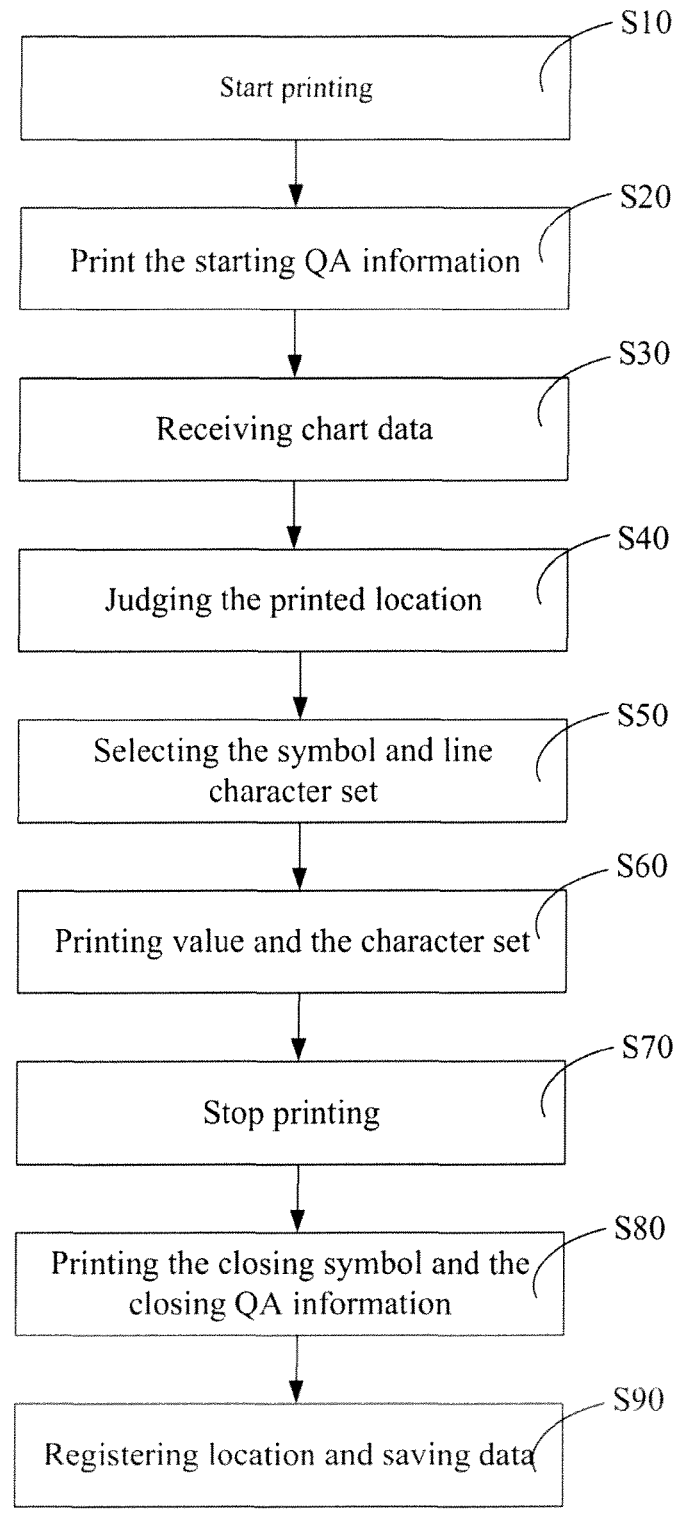
FIG. 2 shows a flowchart of printing according to an embodiment of the present invention.
Figure 3:
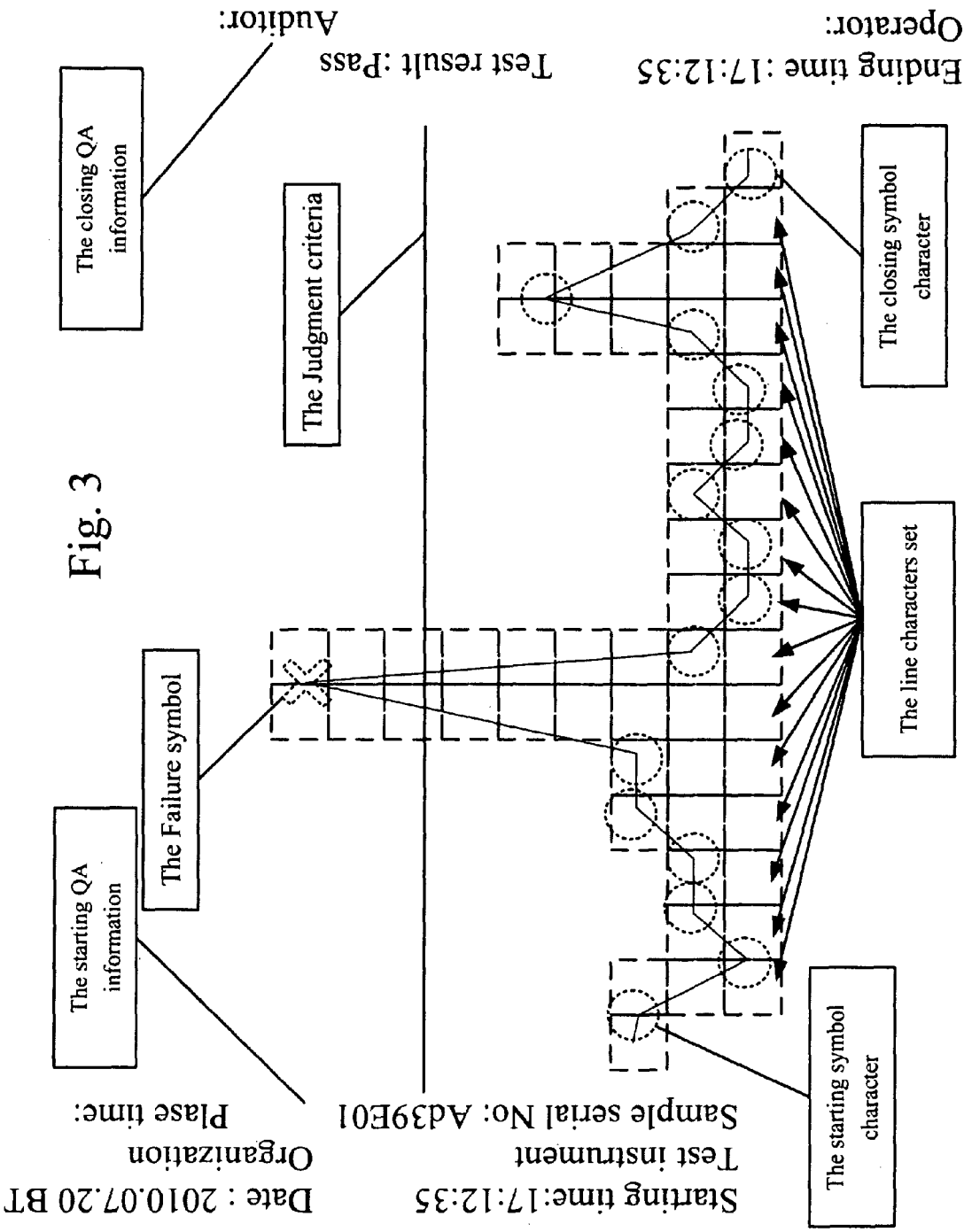
FIG. 3 shows a diagram of a printed chart recorder according to an embodiment of the present invention.
Figure 4:
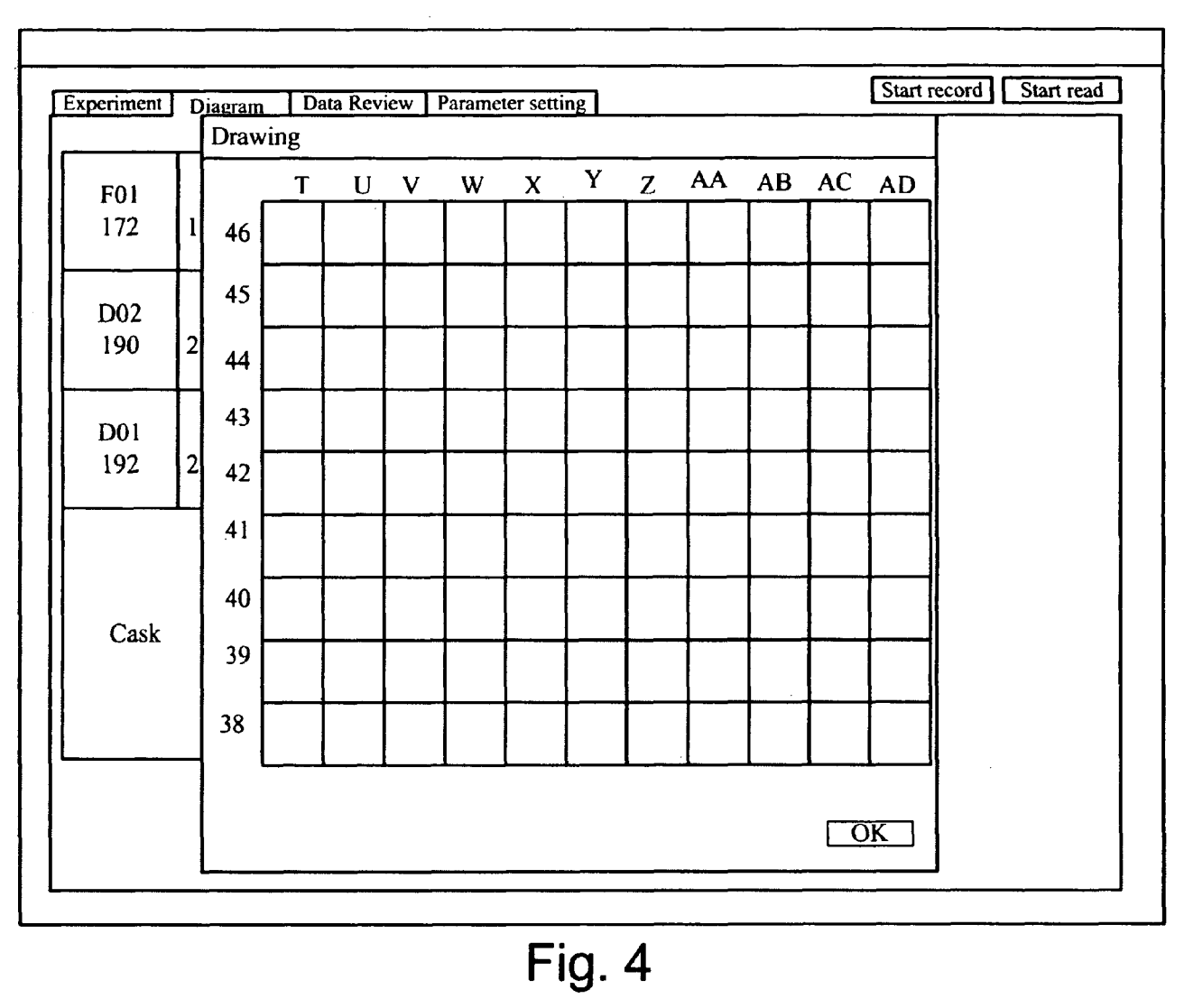

FIG. 2 shows a flowchart of simulating a chart recorder printing procedure according to an embodiment of the present invention. As shown in the figure, the present invention uses the printing control unit 22 to drive the printing unit 24 to emulate the function of a chart recorder, which plots measurement signal variations on paper promptly. The operation control unit 14 controls the working flow of the printing control unit 22. The operation control unit 14 receives the operation signals of the start printing S10 and the stop printing S60 from according to the received signal conversion data. The printing control flow according to the present invention first execute the step S10 for determining if to execute the printing function for paper records by the operation control unit 14. The related QC information, the printing cycle, the start of printing and the stop of printing can be input from the first human-machine interface unit 18. The printing control unit 22 is activated through the operation control unit 14 when the first human-machine interface unit 18 outputs a print starting signal. As shown in the step 20, the printing control unit 22 drives a Dot-matrix printer to print out a starting QA information, which includes print starting time and a testing sample serial. Meanwhile the step 30 is being executed; the step 30 is receiving chart data, which includes all collected data in the period of the print setting. The step 40 is then being executed; the step 40 is operating in response to the data to judge a printed location, wherein the method of the operation, such as the maximum, the minimum, the average and the medium, can be determined by users. If there is a judgment criteria, a qualified or an unqualified representative symbol will be determined after judging the criteria. The step 50 is then being executed; the step 50 is getting an interval and selecting an appropriate symbol character and a line character set in response to the printed location. Referring to FIG. 3, the step 60 is being executed; the step 60 is printing the symbol character and the line character set, wherein it should be noticed that only the starting symbol character would be printed out instead of the line character set when the first data is printed out. The step 70 is continuously being executed; the step 70 is stopping the operation of the printing control unit 22 through the operation control unit 14 when the first human-machine interface unit 18 outputs a print stopping signal; the operation of the printing control unit 22 no longer receives data. The step 80 is then being executed; the step 80 is printing out a closing symbol whose location is same as the location of the last data to arrange together to become an integrated symbol after the printing control unit 22 finishes printing the last set of symbols and line character set. Then, the step 80 is printing out the closing symbol, comprising test ending time, a judgment of the criteria and the place of the users and auditor's signatures. The step 90 is finally being executed; the step 90 is stopping operating the printing control unit 22 and storing the electronic file of the testing data. If there is a display function of the determined testing location, the registration of the testing location is completed at the same time and it is able to be shown in the first human-machine interface unit 18. Referring to FIG. 4, it shows an embodiment of a testing location of the present invention. As shown in FIG. 4, the testing location chart arranged by the testing serial number usually changes its pattern with different cases. In this embodiment, the four triangles formed by dividing a square with "X" represent different testing directions, which are East, West, South, North; and the square having "X" represents location that has been tested. The FIG. 3 shows the testing sample serials Ad39E01, wherein Ad represents Y-coordinate location, 39 represents X-coordinate location, E represents the direction East, and 01 represents the location executed by the first time.

To sum up, the computerized chart recorder according to the present invention has the following advantages:

1. The computerized chart recorder according to the present invention produces the corresponding curve of variation trends of the measurement signals and the quality assurance data according to the measurement data. It prevents non-correspondence between the result of the conventional chart recorder and the quality assurance data. Besides, it also reduces man-made errors and enhances efficiency of quality operations.
2. The present invention uses the operation control unit to set the printing control unit according to the chart data for controlling the output amplitude and percentage range printed by the printing unit, overcoming the problem of adjusting detecting heads sequentially in the conventional chart recorder. In addition, the output amplitude and percentage range can be configured according to request.
3. The present invention can use the computer to connect to the database directly, so that the operation control unit can save the chart data and quality assurance data to the database directly, which is beneficial for organizing the reports of the inspection operations.
4. The present invention uses the human-machine interface to label graphically the measurement locations and progress of the inspection operations, simplifying management of the tasks of the inspection operations.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A computerized chart recorder, comprising:
   a signal conversion unit, receiving a plurality of measurement signal of a measurement instrument, and converting said plurality of measurement signals to a plurality of signal conversion data;
   an operation control unit, connecting to said signal conversion unit, receiving said plurality of signal conversion data, operating said plurality of signal conversion data, producing chart data for producing a curve of signal variations of the instrument, and producing quality assurance data corresponding to said curve of signal variations of the instrument according to said plurality of signal conversion data;
   a database, receiving a plurality of control instructions of said operation control unit for storing said chart data and said corresponding quality assurance data; and
   a printing control unit, receiving said plurality of control instructions of said operation control unit, and producing a corresponding printing control signal for controlling a printing unit to print said corresponding curve of signal variations of the instrument of said plurality of signal conversion data of the instrument signals, alarm messages, and said corresponding quality assurance data; and
   a human-machine interface unit, setting the method of said operation control unit printing said plurality of signal conversion data acquired by said signal conversion unit for determining the output amplitude and the percentage range and for setting specific a threshold value, and said operation control unit producing said alarm messages according to said threshold value, and said human-machine interface unit displaying graphically the inspection locations.

2. The computerized chart recorder of claim 1, wherein said database further stores said curve of signal variations of the instrument.

3. The computerized chart recorder of claim 1, wherein said quality assurance data comprises at least a measurement time, the name of said measurement instrument, the measurement item, the corresponding measurement location, the name of the person who measures said chart data, and the name of at least an auditor.

4. The computerized chart recorder of claim 1, wherein said printing control unit selects a printing character, a printing location, and a printing value according to said chart data, and producing said printing control signal according to said printing character, said printing location, said printing value, said quality assurance data, and a signature location.

5. The computerized chart recorder of claim 1, and further comprising a human-machine interface unit, connecting to said operation control unit and said database, displaying said curve of signal variation of the instrument produced by said operation control unit, and reading and displaying said chart data and said quality assurance data stored in said database.

6. The computerized chart recorder of claim 1, and further comprising a remote unit, connecting to and controlling said operation control unit.

7. The computerized chart recorder of claim 6, wherein said remote unit is a microprocessor or a digital signal processor.

8. The computerized chart recorder of claim 1, wherein said operation control unit further produces an alarm message according to a threshold value and said chart data.

9. The computerized chart recorder of claim 1, wherein said operation control unit further produces at least a display label according to at least a threshold value and said chart data.

10. The computerized chart recorder of claim 1, wherein said operation control unit is a microprocessor or a digital signal processor.

11. The computerized chart recorder of claim 1, wherein said database further stores at least a prompting message according to said control instructions.

12. The computerized chart recorder of claim 1, wherein said database further integrates said chart data and said corresponding quality assurance data according to said plurality of control instructions, and establishes corresponding index data.

13. The computerized chart recorder of claim 1, wherein said printing control unit further controls the printing speed and the paper-feeding rate of said printing unit.

* * * * *